United States Patent
Khitrov et al.

(10) Patent No.: US 10,970,573 B2
(45) Date of Patent: Apr. 6, 2021

(54) METHOD AND SYSTEM FOR FREE TEXT KEYSTROKE BIOMETRIC AUTHENTICATION

(71) Applicant: ID R&D, Inc., New York, NY (US)

(72) Inventors: Alexey Khitrov, New York, NY (US); Konstantin Simonchik, St. Petersburg (RU)

(73) Assignee: ID R&D, INC., New York, NY (US)

( * ) Notice: Subject to any disclaimer, the term of this patent is extended or adjusted under 35 U.S.C. 154(b) by 0 days.

(21) Appl. No.: 16/396,562

(22) Filed: Apr. 26, 2019

(65) Prior Publication Data

US 2019/0332876 A1 Oct. 31, 2019

Related U.S. Application Data

(60) Provisional application No. 62/663,659, filed on Apr. 27, 2018.

(51) Int. Cl.
   *G06K 9/00* (2006.01)
(52) U.S. Cl.
   CPC .................. *G06K 9/00885* (2013.01)
(58) Field of Classification Search
   CPC ............................ G06F 21/32; G06K 9/00885
   See application file for complete search history.

(56) References Cited

U.S. PATENT DOCUMENTS

| | | | |
|---|---|---|---|
| 10,042,993 B2 | 8/2018 | Beigi | |
| 2008/0010065 A1* | 1/2008 | Bratt | G06K 9/6222 704/246 |

(Continued)

FOREIGN PATENT DOCUMENTS

| | | |
|---|---|---|
| CN | 105810199 A | 7/2016 |
| ES | 2605779 T3 | 3/2017 |

(Continued)

OTHER PUBLICATIONS

Tomi Kinnunen, Haizhou Li. An Overview of Text-Independent Speaker Recognition: from Features to Supervectors. Speech Communication, Elsevier: North-Holland, 2009, 52 (1), pp. 12.

(Continued)

*Primary Examiner* — David Bilodeau
(74) *Attorney, Agent, or Firm* — Finnegan, Henderson, Farabow, Garrett & Dunner, LLP (57) ABSTRACT

A method for user authentication based on keystroke dynamics is provided. The user authentication method includes receiving a keystroke input implemented by a user; separating a sequence of pressed keys into a sequence of bigrams having bigram names simultaneously with the user typing free text; collecting a timing information for each bigram of the sequence of bigrams; extracting a feature vector for each bigram based on the timing information; separating feature vectors into subsets according to the bigram names; estimating a GMM user model using subsets of feature vectors for each bigram; providing real time user authentication using the estimated GMM user model for each bigram and bigram features from current real time user keystroke input. The corresponding system is also provided. The GMM based analysis of the keystroke data separated by bigrams provides strong authentication using free text input, while user additional actions (to be verified) are kept at a minimum. The present invention allows to drastically improve accuracy of user authentication with low performance requirements that allows to implement authentication software for low-power mobile devices.

15 Claims, 3 Drawing Sheets

(56) References Cited

U.S. PATENT DOCUMENTS

| | | | | |
|---|---|---|---|---|
| 2008/0091453 | A1* | 4/2008 | Meehan | G06Q 20/40145 705/317 |
| 2008/0092209 | A1* | 4/2008 | Davis | G06F 21/316 726/2 |
| 2008/0098456 | A1* | 4/2008 | Alward | G06F 21/316 726/1 |
| 2013/0343616 | A1 | 12/2013 | Forero et al. | |
| 2015/0347734 | A1* | 12/2015 | Beigi | H04L 9/3231 713/155 |
| 2016/0269411 | A1* | 9/2016 | Malachi | H04L 63/10 |
| 2019/0130168 | A1* | 5/2019 | Khitrov | G06N 3/08 |

FOREIGN PATENT DOCUMENTS

| | | |
|---|---|---|
| WO | 2007128975 | 11/2007 |
| WO | 2018011437 A1 | 1/2018 |

OTHER PUBLICATIONS

MD Liakat Ali, Charles C. Tappert, Meikang Qiu, and John V. Monaco. Authentication and Identification Methods Used in Keystroke Biometric Systems. 2015 IEEE 17th International Conference on High Performance Computing and Communications (HPCC), 2015 IEEE 7th International Symposium on Cyberspace Safety and Security (CSS), and 2015 IEEE 12th International Conf on Embedded Software and Systems (ICESS). pp. 1424-1429.

Chandralekha Jadhav, Siddhi Kulkarni, Sagar Shelar, Kaustubh Shinde, Nagaraj V. Dharwadkar. Biometric Authentication Using Keystroke Dynamics. International conference in Social, Mobile, Analytics and Cloud 2017. pp. 870-875.

M. Erdal Özbek, Mohamed Amine Haytom, Estelle Cherrier. Recognition of Biometric Unlock Pattern by GMM-UB. Normandie Univ. IEEE. 2018 26th Signal Processing and Communications Applications Conference.

Peter Ordal, David Ganzhorn, David Lu, Warren Fong, Jonathan Blair Norwood, advised by Michael L. Scott. Continuous Identity Verification through Keyboard Biometrics. Journal of Undergraduate Research. vol. 4. Iss. 1. Fall 2005. pp. 20-24.

Hayreddin Çeker. Keystroke Dynamics for Enhanced User Recognition in Active Authentication. State University of New York at Buffalo. 2017.

Gabriel Jaime Zapata-Zapata, Julián David Arias-Londoño, Jesús Francisco Vargas-Bonilla, Juan Rafael Orozco-Arroyave. On-line signature verification using Gaussian Mixture Models and small-sample learning strategies. Revista Facultad de Ingeniería, Universidad de Antioquia, No. 79, 2016, pp. 84-97.

Pin Shen Teh, Andrew Beng Jin Teoh, Thian Song Ong, Han Foon Neo. Statistical Fusion Approach on Keystroke Dynamics. Third International IEEE Conference on Signal-Image technologies and Internet-Based System 2008. pp. 918-923.

* cited by examiner

METHOD AND SYSTEM FOR FREE TEXT KEYSTROKE BIOMETRIC AUTHENTICATION

This application claims priority from Provisional Application 62/663,659, filed Apr. 27, 2018, entitled "A system method and apparatus for accurate free text keystroke biometric authentication".

FIELD OF THE INVENTION

The present invention generally relates to user authentication, and more particularly to a user authentication method and corresponding system based on keystroke biometrics.

BACKGROUND OF THE INVENTION

The field of biometrics based on measuring of physical characteristics to recognize an identity or verify a claimed identity of an individual has emerged as an increasingly reliable methodology for verification (one-to-one) and identification (one-to-many) of individuals. Biometrics has become a very powerful tool in solving of problems associated with requiring positive identification of individuals.

Recently, many studies on biometrics have been conducted. Biometrics is widely applied to biometric authentication systems using face or iris recognition, mobile phone security, mobile commerce, physical/logical access control, e-commerce, and the like. However, poor attention is paid to frictionless, non-collaborative biometrics.

The way consumers communicate with an enterprise and each other is constantly changing. One of the growing trends is use of Conversational Interface where information and services are provided through conversations with chat-bots (e.g. banking chat-bots). In order to be able to share sensitive data and conduct monetary transactions an enterprise needs to authenticate users through a typing manner.

An interest for continuous frictionless authentication within the Conversational Interface is growing rapidly. It may be necessary to perform authentication in chat-bots using keystroke biometrics while users type some text without asking these users to perform any additional activities.

Many approaches were used in the art to verify user identity via keystroke dynamics. One of them is disclosed in the article "Web-based keystroke dynamics identity verification using neural network", S. Cho, C. Han, D. H. Han, and H.-I. Kim, Journal of Organizational Computing and Electronic Commerce, vol. 10, no. 4, pp. 295-307, 2000. The method uses neutral networks. The main problem of neural networks is that it is a heavyweight algorithm and requires imposters' samples for training. Furthermore, this method provides low accuracy for user verification when small amount of data is presented.

Also known in the prior art is US2015/0169854 disclosing a keystroke authentication system and method using the Support Vector Machine (SVM) approach and an approach based on Kernel Ridge Regression. The input from a user is represented with features that include natural pauses among digraphs and are used as cognitive fingerprints. The method considers unique cognitive typing rhythm for a sequence of bigrams. The system builds a classifier from a legitimate user keystroke pattern and some imposters pattern with abovementioned approaches. The classifier used to generate score between the testing set of features and stored trained profile. Since the proposed method and system rely on features including the sequence of digraphs of a specific word representing cognitive factors manifesting as natural pauses in typing of the specific word a more powerful software is required to process features data and to build each classifier for legitimate user and imposters as well as the accuracy is affected.

While known solutions may be suitable for the particular purpose to which they address, they are not as suitable for providing a quick, rely and accurate authentication in free-text input scenarios. Conventional authentication systems and methods are extremely time consuming and possess high performance requirements.

SUMMARY OF THE INVENTION

It is an object of the present invention to provide a more accurate, fast and simple method for user authentication using keystroke dynamics.

It is a further object of the present invention to improve and to increase a quality of user authentication using keystroke dynamics.

It is a still further object of the present invention to provide a user authentication method based on keystroke dynamics suitable for any language keystroke input and free text keystroke input.

In a first aspect of the present invention a user authentication method for authenticating a user using a keystroke dynamics is provided. The method comprises receiving a user keystroke input implemented by the user typing free text; separating a sequence of pressed keys based on the user keystroke input into a sequence of first bigrams having first bigram names simultaneously with the user typing free text; collecting a first timing information for each first bigram of the sequence of first bigrams; extracting a feature vector for each first bigram of the sequence of first bigrams based on the first timing information; separating extracted feature vectors for each first bigram of the sequence of first bigrams into subsets according to the first bigram names; estimating a Gaussian Mixture Model (GMM) user model using the subsets of feature vectors for each first bigram of the sequence of first bigrams using a Universal Background Model (UBM) as a predefined GMM; and providing real time user authentication using the estimated GMM user model for each first bigram of the sequence of first bigrams and bigram feature vectors generated based on a current user keystroke input implemented by the user.

In some embodiments the bigram feature vectors are generated based on a current user keystroke input using the following steps: receiving a current user keystroke input implemented the user;

separating a sequence of pressed keys based on the current user keystroke input into a sequence of second bigrams having second bigram names; collecting a second timing information for each second bigram of the sequence of second bigrams; and extracting a bigram feature vector for each second bigram of the sequence of second bigrams based on the second timing information. In some embodiments, the method may further comprise building a bigram template for each bigram comprising a GMM supervector. Preferably, the GMM supervector is estimated using MAP adaptation. Preferably, the GMM model is estimated using GMM supervector. Providing real time user authentication may comprise determining a keystroke likelihood ratio for each bigram. Providing real time user authentication may further comprise determining a total biometric score by fusing the likelihood ratios for each bigram. Providing real time user authentication may still further comprise matching the total biometric score with a predetermined threshold.

In some embodiments, the feature vectors are normalized with goal of the gaussenization of bigram features.

In some embodiments, the total biometric score is calculated using at least a weighted fusion.

In some embodiments, the keystroke input is implemented via a touch screen or a physical keyboard.

In some embodiments, the user authentication method is applicable for the keystroke input performed at any language.

In a second aspect of the present invention, a system for user authentication is provided. The system comprises a user input interface module providing a user input interface and a user input, the user input interface including a keyboard or a touchscreen keyboard; a computing module separating a sequence of pressed keys based on the user input into a sequence of first bigrams having first bigram names and collecting a first timing information for each first bigram of the sequence of first bigrams; an extraction module extracting a feature vector for each first bigram of the sequence of first bigrams based on the first timing information; a separating module separating extracted feature vectors into subsets according to the first bigram names; and an estimating module estimating a Gaussian Mixture Model (GMM) user model using the subsets of feature vectors for each first bigram of the sequence of first bigrams using a Universal Background Model (UBM) as a predefined GMM, wherein the estimating module also provides real time user authentication using the estimated GMM user model for each first bigram of the sequence of first bigrams and bigram feature vectors generated based on a current user keystroke input implemented by the user In a third aspect of the present invention, a system for user authentication is provided. The system comprises a user input interface module providing a user input interface and a user input, the user input interface including a keyboard or a touchscreen keyboard; a computing module separating a sequence of pressed keys based on the user input into a sequence of first bigrams having first bigram names and collecting a first timing information for each first bigram of the sequence of first bigrams; an extraction module extracting a feature vector for each first bigram of the sequence of first bigrams based on the first timing information; a matching module configured to match the feature vector for each first bigram of the sequence of first bigrams with a stored template for each first bigram of the sequence of first bigrams producing a likelihood ratio for each first bigram of the sequence of first bigrams, wherein the stored template is obtained by estimating a Gaussian Mixture Model (GMM) user model for each first bigram of the sequence of first bigrams using a Universal Background Model (UBM) as a predefined GMM; a fusion module configured to fuse the likelihood ratios for all first bigrams to produce a total biometric score; and an authentication module configured to make an authentication decision based upon comparison of the total biometric score with a predetermined threshold.

The present invention drastically improves accuracy and quality of user authentication by a free text keystroke dynamics analysis and also provides low performance requirements that allows to implement authentication methods and authentication systems in low-power mobile devices.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the drawings, wherein:

DETAILED DESCRIPTION OF THE PREFERRED EMBODIMENTS

The present invention will now be described more fully with reference to the accompanying drawings, in which example embodiments of the present invention are illustrated. The subject matter of this disclosure may, however, be embodied in many different forms and should not be construed as being limited to the embodiments set forth herein.

The following example embodiments of the present invention are provided for user authentication when user types free text in English. However, the present invention is not limited to English text keystroke dynamics analysis and is also applicable for user authentication when user types in a language that is different from English.

In order to authenticate a user according to the present invention, the proposed method mainly consists of two stages. The first stage concerns user enrollment, which means capturing keystroke biometric data, and the second stage concerns user authentication, where it is decided if the user is a legitimate user or a fake user.

Hereinafter, the two stages will be fully described with reference to FIGS. 1 and 2.

Figure 1:
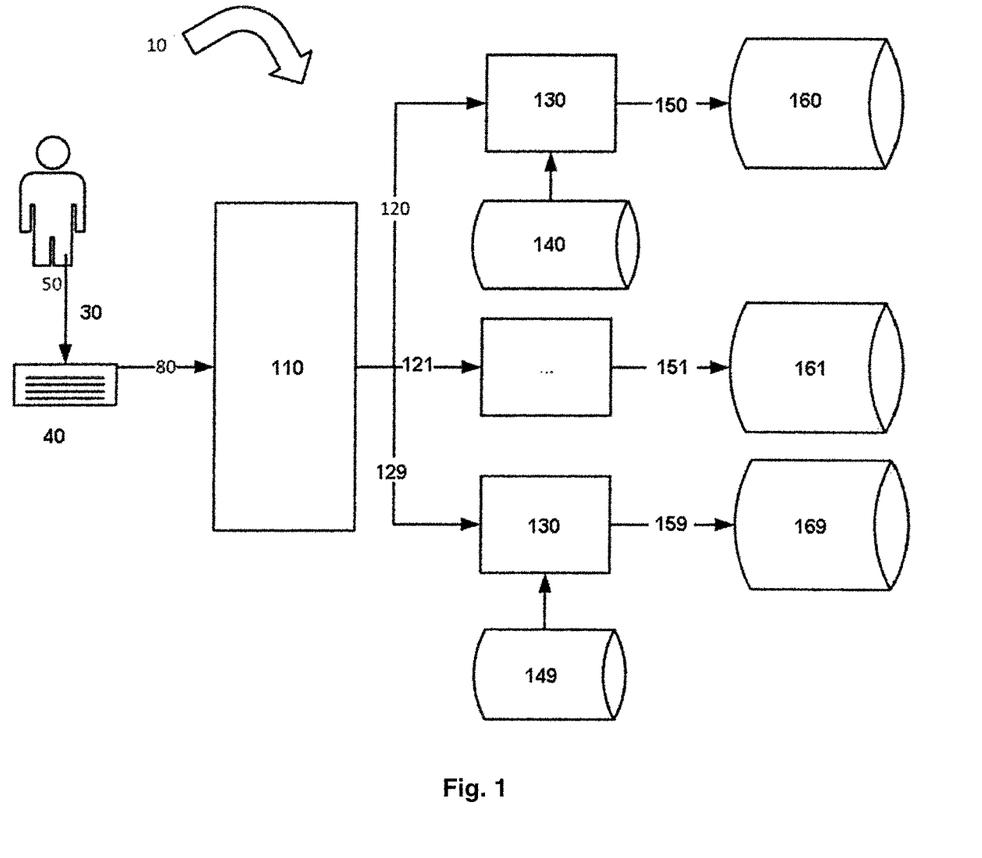
FIG. 1 shows a flow diagram of a user authentication method at an enrollment stage according to an example embodiment of the present invention.

Referring to FIG. 1, a flow diagram of an enrollment stage 10 of user authentication method 100 is shown according to one embodiment of the present invention.

The enrollment stage 10 generally includes feature extraction in order to create a template of an enrolled user and its storage. The template represents a keystroke typing manner for a certain legitimate user. The template may be stored by a third party in any known manner and is used for further user authentication on the side of the third party.

The enrollment stage 10 of the user authentication method 100 starts at step 30 of receiving a keystroke input implemented by a user 50 where the user 50 interacts with a keyboard in his or her typical manner by typing a free text.

The method further proceeds to step 40 of separating the keystroke input being a sequence of pressed keys into bigrams, i.e. two successively pressed keys. A number of possible bigrams corresponds to a number of possible pairs of characters in a certain language. For example, the common number of characters in English is 26, thus, a possible number of pairs of characters ranges from 1 to 676 pairs, such as 'aa', 'ab', 'ac' . . . 'zz'.

After separating the free text keystroke input into bigrams, the method continues with step 80 of collecting a timing information for each bigram commonly referred to as bigram features. The timing information comprises the following timing differences: time delay between key #1 press and key #1 release (PR1), time delay between key #1 press and key #2 press (PP), time delay between key #1 release and key #2 press (RP), time delay between key #2 press and key #2 release (PR2). According to the present invention, the method includes continuously capturing keypress and key release timings associated with each bigram in order to obtain keystroke characteristics.

Once the timing information is collected the method proceeds to step 110 of extracting a feature vector for each bigram of the sequence of bigrams consisting of all collected timings for each bigram. The extracted feature vector is a multidimensional vector, which dimension depends on the number of collected timings. In the preferred embodiment, the feature vector of the present invention is a four-dimensional vector.

The method may additionally include normalization of the feature vector. Normalization includes transforming each feature vector with a nonlinear function (e.g. logarithm function) with a goal to gaussenization of the feature distribution.

It should be noted that at least one feature vector will be extracted for each bigram name. However, as it will be obvious for the one skilled in the art, the keystroke input may include a plurality of bigrams having similar bigram names. Therefore, the number of feature vectors extracted for similar bigram names correspond to the number of similar bigram names. For example, if 'aa' bigram was met twice in a sequence of bigrams, two feature vectors will be extracted for that bigram.

The method further includes a step (120, 121 . . . 129) of separating a sequence of feature vectors extracted for each bigram into independent subsets according to bigram names—'aa', 'ac', . . . , 'yz', 'zz'.

The following steps of the enrollment stage relate to creating a template of a legitimate user based on the subsets of feature vectors for each bigram name.

The method according to the present invention uses a GMM-UBM approach.

At step (140 . . . 149) the method includes retrieving a universal background model (UBM), namely a predefined GMM, as initial data for each bigram for further processing. UBM is a user-independent model and represents user-independent distribution of the feature vectors. When enrolling a new user, parameters of UBM are adapted using newly obtained feature vector for a given user to be authenticated. Thus, UBM represents a prior knowledge on general user data used to estimate a model for the given user.

The method further proceeds to step 130 of adaptation of mean vectors of UBM into a Gaussian Mixture Model (GMM) as a user model using maximum a posteriori (MAP) adaptation principle. In one embodiment, maximum a posteriori adaptation of UBM into GMM is performed for each bigram name using a subset of feature vectors for a certain bigram as an input.

At step (150, 151 . . . 159), the method includes estimating a GMM supervector for each bigram 'aa' . . . 'zz' as weighted sums of UBM mean and newly obtained keystroke feature vectors according to the following equation:

$$\mu_m^{(GMM)} = (1 - \alpha_m)\mu_m^{(UBM)} + \alpha_m \frac{Fm}{Nm},$$

wherein $\mu_m^{(GMM)}$ is an adapted mean Gaussian supervector, $\mu_m^{(UBM)}$ is a prior knowledge represented with mean vectors of the UBM, $$\frac{F_m}{N_m}$$

is an expected mean mature vector for adaptation data, and $\alpha_m$ is an adaptation speed that controls balance between the new data and prior knowledge.

The adaptation speed is defined as follows:

$$\alpha_m = \frac{N_m}{N_m + \tau},$$

where $\tau$ is a relevant constant.

Posteriors and $0^{th}$ and $1^{st}$ order statistics for m-th component are defined as follows:

$$F_m = \sum_t^T \gamma_m^{(t)} \cdot D(t)$$

$$N_m = \sum_t^T \gamma_m^{(t)},$$

$$\gamma_m^{(t)} = \frac{\pi_m \cdot N_m(D^{(t)} | \theta_m)}{\sum_k^M \pi_k \cdot N_k(D^{(t)} | \theta_k)}$$

As a result of the adaptation step 130, a GMM supervector consisting of stacked MAP-adapted means is obtained.

In one embodiment, additional normalization technique of the GMM supervector can be implemented using division of the supervector by the UBM covariances and multiplication of the result of the division by the UBM weights. This allows for additional acceleration when matching the stored template with a new data.

At this stage, the biometric enrollment is done and the method comprises creating (160, 161 . . . 169) a template for each bigram comprising the biometric keystroke pattern characteristics for a given user represented with the GMM supervector. Accordingly, the template stores as many GMM supervectors as many different bigrams are presented. The GMM supervector possess more accurate and full biometrics since it is estimated for each bigram using at least one and at most a plurality of feature vectors with different timings, i.e. the GMM supervector comprises many adapted timings for one bigram and, thus, represents full and complete timing characteristics of that bigram. Thus, use of the template created in accordance with the present invention at authentication stage provides more accurate and reliable authentication, rather than comparing stored feature vectors with tested feature vectors or comparing an estimated GMM model for a sequence of bigrams with tested data.

Figure 2:
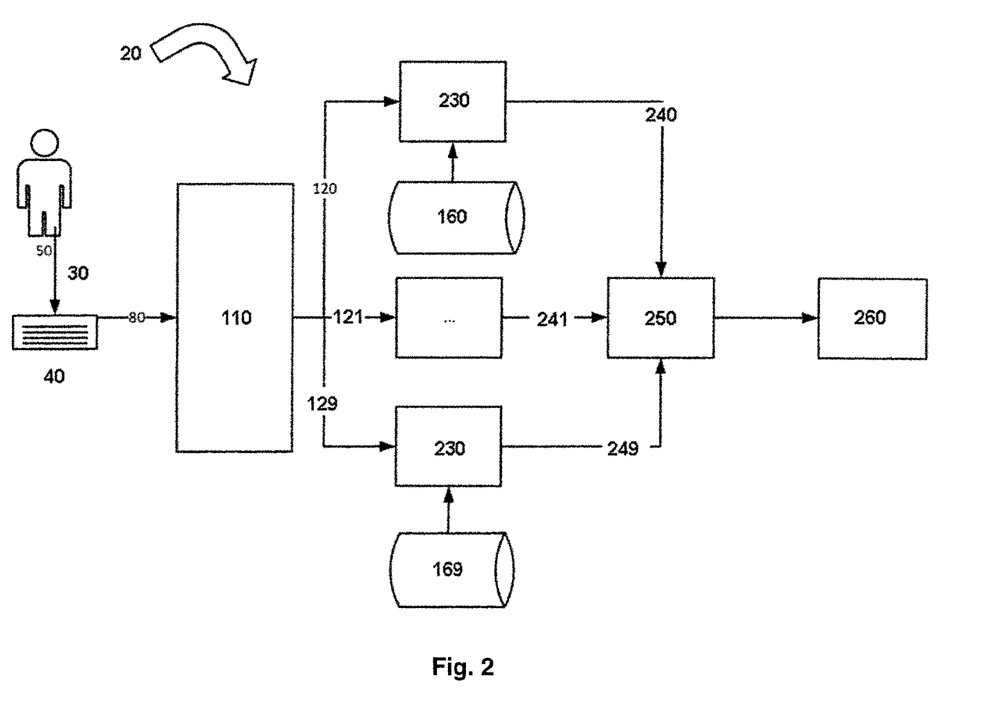
FIG. 2 shows a flow diagram of a user authentication method at an authentication stage according to an example embodiment of the present invention.

Further, the method proceeds to user authentication stage 20, which is illustrated in FIG. 2. At this stage, an enrolled user types a testing free text, where after the user is verified by comparing the current (real time) keystroke dynamics with the stored template.

Current keystroke dynamics acquired from the user is processed to extract real time feature vectors for each bigram in accordance with the previously described enrollment stage.

In particular, the method includes step 30 of receiving a keystroke input implemented by the user 50 where the user 50 interacts with a keyboard in his or her typical manner by typing a testing free text.

The method further proceeds to step 40 of separating the keystroke input being a sequence of pressed keys into bigrams.

At step 80 the method includes collecting timing information for each bigram, and then at step 110 the method includes extracting a feature vector for each bigram consisting of all collected timings for each bigram. The method further includes a step (120, 121 . . . 129) of separating a sequence of feature vectors extracted for each bigram into independent subsets according to bigram names.

Hereinafter, the method includes determining (240 . . . 249) a keystroke likelihood ratio for each bigram. At this step the GMM supervector from template (160 . . . 169) is used to built a GMM model, which consists of Gaussian weights $\omega_k$, Gaussian covariance matrixes $Cov_k$, and mean Gaussian supervector $\mu_m^{(GMM)}$, wherein Gaussian weights $\omega_k$, Gaussian covariance matrixes $Cov_k$ are constant parameters. The GMM mode describes a distribution of subsets of feature vectors obtained for a certain bigram name. To determine the likelihood ratio, the method commences at step 230 of matching of new feature vectors with GMM model of keystroke characteristics stored in the template (160 . . . 169) for each bigram. Accordingly, new bigram features are compared with corresponding background bigram template (160 . . . 169) stored at the enrollment stage, thus, producing the likelihood ratio.

The likelihood ratio (LR) is estimated for k-th bigram as follows:

$$LR^k = \log p(D^{(k)} | \lambda_{Template}^{(k)}) - \log(D^{(k)} | \lambda_{UBM}^{(k)})$$

wherein k is a number of bigrams, $\lambda_{Template}^{(k)}$—is a GMM model from template, $\lambda_{UBM}^{(k)}$—model estimated for newly obtained bigram features.

Experiments conducted by the inventors have shown that comparison between testing feature vector for a specific bigram obtained when testing text input is performed by a user, with stored template of GMM model for corresponding bigram showing feature vectors distribution for a similar bigram may be simply performed by processing logic, since the logic has to estimate likelihood of matching of feature vector for specific bigram into the stored model showing distribution of feature vectors for the similar bigram, i.e. the processing logic would not have to sort through the model, which is estimated for all available bigrams, until the analogous bigram is found to perform comparison. Comparison performed for each bigram separately highly improves accuracy of the final user authentication and also increases the speed of processing.

The method further includes step 250 of determining a total biometric score of the user authentication method according to the present invention by fusing likelihood ratios for each bigram. In one embodiment, at least a weighted combination of likelihood ratios obtained for each bigram is applied to calculate the total biometric score. At least equal weights (according to a number of bigrams) are applied. In another embodiment, the total biometric score is calculated as an average likelihood ratio among likelihood ratios obtained for each bigram.

According to another embodiment, the total biometric score may be calculated based on an output of KL divergence. KL divergence is a commonly known method of mathematical statistics, and, thus, its description is omitted.

The method further proceeds to step 260 of user authentication, which includes comparing the total biometric score with a predetermined threshold. At step 260 an authentication decision is made according to which the user is granted access or not. In particular, if a match value exceeds a threshold, the system concludes that the user is a valid one, and if not, the user is considered to be fake.

It will be obvious for the one skilled in the art that behavioral biometrics may change over time for a given user. In view of this, each time a user is authenticated, the template consisting of stored GMM supervectors estimated for each bigram and associated with this given user can be optionally updated. This may involve, for example, enrichment of the stored template of a specific bigram for this given user with newly obtained feature vectors for a similar bigram and for the same user. The newly obtained feature vectors are processed in the same way as disclosed with reference to FIG. 1 in order to enrich the stored template. The method may optionally include an enrichment step to perform the abovementioned dynamic updating. This process enables to improve the authentication method each time the user makes an input and is considered as legitimate user and enhance reliability of the authentication method.

The user authentication method of the present invention uses GMM-UBM approach for each bigram, and, thus, the resulted total biometric score used for further authentication is more accurate for specific user since it considers timing biometrics for each bigram.

As was mentioned above, the user authentication method is applicable for free text typing in any language. The main difference for user authentication when inputting at language different from English is that bigram names are different and that the predetermined threshold may be different for each language.

Figure 3:
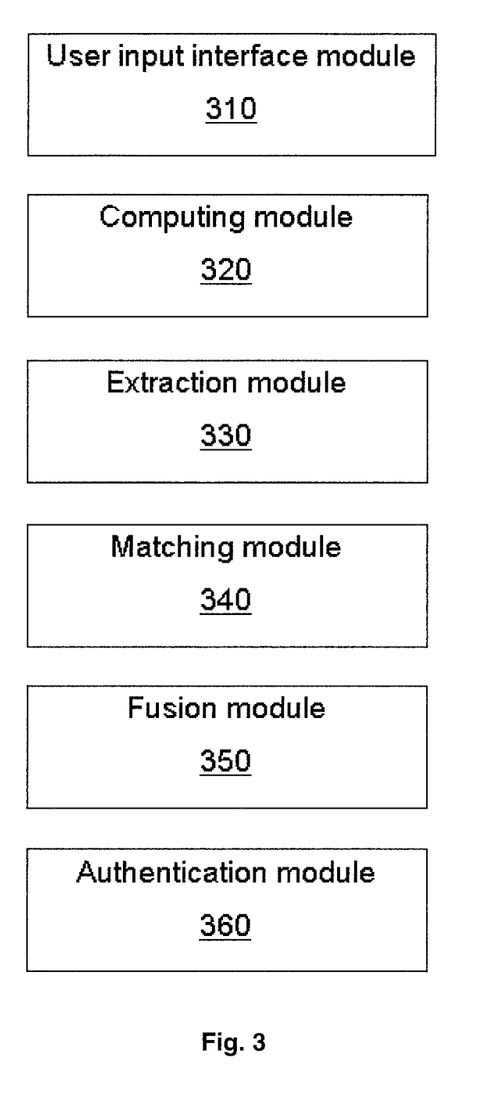
FIG. 3 shows a block diagram of a user authentication system 200 according to an example embodiment of the present invention.

Referring to FIG. 3, a block diagram of the user authentication system 300 is shown according to an example embodiment of the present invention.

The user authentication system 300 may comprise a user input interface module 310 configured to provide a user input, where the user input interface includes a keyboard or a touchscreen keyboard.

The system 300 may further comprise a computing module 320 configured to separate a sequence of pressed keys into a sequence of bigrams. The computing module 320 may be configured to acquire a biometric data relating to keystroke biometrics, such as, for example, a timing information for each bigram.

The system 300 may further comprise an extraction module 330 configured to process user biometrics data and generate a feature vector for each bigram based on biometrics data, i.e. timing information.

The system 300 may further comprise a matching module 340 configured to match the feature vector for each bigram with a stored template for each bigram producing a likelihood ratio for each bigram. The stored template is obtained by estimating a Gaussian Mixture Model (GMM) user model for each bigram using a Universal Background Model (UBM) as a predefined GMM in accordance with enrollment stage of user authentication method. The matching module 340 may be additionally configured to retrieve the stored bigram template for corresponding bigram associated with the given user. Preferably, bigram templates are stored at a third party requiring authentication. By the result of the matching, a likelihood ratio is calculated for each bigram.

The system 300 may further comprise a fusion module 350 configured to fuse the likelihood ratios for all bigrams to produce a total biometric score.

The system 300 may further comprise an authentication module 360 making an authentication decision. The authentication module 360 compares the total biometric score with a predetermined threshold. The authentication decision can be then sent to a requested software, operational system, website, computer, server, etc. to grant access to a particular user.

Experiments

Authors of the present invention has conducted experiments in order to evaluate accuracy of the user authentication method according to the present invention. The evaluation of Keystroke authentication method was made using ATVS-Keystroke keystroke database. Two repetitions of each text field typing were used for enroll and one repetition of each field for test.

The ATVS-Keystroke database comprises 63 users with 12 genuine accesses and 12 impostor accesses for each user for a total number of samples equal to 7680 (63 users×24 access×5 data). People from two different nationalities were involved with 60% of males and 40% females.

Five text fields were used per session: name; surname; nationality; id; e-mail.

Two modes of Keystroke Biometrics were used: with score normalization and without it. The score normalization procedure can be used if biometrics system has keystroke data extracted from exactly the same text as target user typed, but typed by another users (impostors). The resulted accuracy of user authentication method for score normalization procedure was 97.8%, and for no score normalization procedure was 92.7%.

It will be apparent to one of skill in the art that described herein is a novel system method and apparatus for free keystroke biometric authentication. While the invention has been described with reference to specific preferred embodiments, it is not limited to these embodiments. The invention may be modified or varied in many ways and such modifications and variations, as would be obvious to one of skill in the art, are within the scope and spirit of the invention and are included within the scope of the following claims.

What is claimed is:

1. A user authentication method for authenticating a user using a keystroke dynamics, the method comprising:
receiving a user keystroke input implemented by the user typing free text;
separating a sequence of pressed keys based on the user keystroke input into a sequence of first bigrams having first bigram names simultaneously with the user typing free text;
collecting a first timing information for each first bigram of the sequence of first bigrams;
extracting a feature vector for each first bigram of the sequence of first bigrams based on the first timing information;
separating extracted feature vectors for each first bigram of the sequence of first bigrams into subsets according to the first bigram names;
estimating a Gaussian Mixture Model (GMM) user model using the subsets of feature vectors for each first bigram of the sequence of first bigrams using a Universal Background Model (UBM) as a predefined GMM; and
providing real time user authentication using the estimated GMM user model for each first bigram of the sequence of first bigrams and bigram feature vectors generated based on a current user keystroke input implemented by the user.

2. The user authentication method according to claim 1, wherein the bigram feature vectors are generated based on a current user keystroke input using the following steps:
receiving a current user keystroke input implemented the user;
separating a sequence of pressed keys based on the current user keystroke input into a sequence of second bigrams having second bigram names;
collecting a second timing information for each second bigram of the sequence of second bigrams; and
extracting a bigram feature vector for each second bigram of the sequence of second bigrams based on the second timing information.

3. The user authentication method according to claim 1, further comprising building a bigram template for each first bigram, the bigram template comprising a GMM supervector.

4. The user authentication method according to claim 3, wherein the GMM supervector is estimated using MAP adaptation.

5. The user authentication method according to claim 4, wherein the GMM user model is estimated using GMM supervector.

6. The user authentication method according to claim 1, wherein the step of providing real time user authentication comprises determining a keystroke likelihood ratio for each first bigram of the sequence of first bigrams.

7. The user authentication method according to claim 6, wherein the step of providing real time user authentication further comprises determining a total biometric score by fusing of the likelihood ratios for each first bigram of the sequence of first bigrams.

8. The user authentication method according to claim 7, wherein the providing step of real time user authentication further comprises matching the total biometric score with a predetermined threshold.

9. The user authentication method according to claim 7, wherein the total biometric score is determined using at least a weighted fusion.

10. The user authentication method according to claim 1, wherein the feature vectors are normalized with a goal of gaussenization of the first bigram features.

11. The user authentication method according to claim 1, wherein the user keystroke input is implemented via a touch screen or a physical keyboard.

12. The user authentication method according to claim 1, wherein the user authentication method is applicable for a user keystroke input performed at any language.

13. A system for user authentication using a keystroke dynamics, the system comprising:
a user input interface module providing a user input interface and a user input, the user input interface including a keyboard or a touchscreen keyboard;
a computing module separating a sequence of pressed keys based on the user input into a sequence of first bigrams having first bigram names and collecting a first timing information for each first bigram of the sequence of first bigrams;
an extraction module extracting a feature vector for each first bigram of the sequence of first bigrams based on the first timing information;
a separating module separating extracted feature vectors into subsets according to the first bigram names;
and an estimating module estimating a Gaussian Mixture Model (GMM) user model using the subsets of feature vectors for each first bigram of the sequence of first bigrams using a Universal Background Model (UBM) as a predefined GMM, wherein the estimating module also provides real time user authentication using the estimated GMM user model for each first bigram of the sequence of first bigrams and bigram feature vectors generated based on a current user keystroke input implemented by the user.

14. The system for user authentication to claim 13, wherein the estimating module generates the bigram feature vectors based on a current user keystroke input implemented by the user by:
   receiving a current user keystroke input implemented the user;
   separating a sequence of pressed keys based on the current user keystroke input into a sequence of second bigrams having second bigram names;
   collecting a second timing information for each second bigram of the sequence of second bigrams; and
   extracting a bigram feature vector for each second bigram of the sequence of second bigrams based on the second timing information.

15. A system for user authentication using a keystroke dynamics, the system comprising:
   a user input interface module providing a user input interface and a user input, the user input interface including a keyboard or a touchscreen keyboard;
   a computing module separating a sequence of pressed keys based on the user input into a sequence of first bigrams having first bigram names and collecting a first timing information for each first bigram of the sequence of first bigrams;
   an extraction module extracting a feature vector for each first bigram of the sequence of first bigrams based on the first timing information;
   a matching module configured to match the feature vector for each first bigram of the sequence of first bigrams with a stored template for each first bigram of the sequence of first bigrams producing a likelihood ratio for each first bigram of the sequence of first bigrams, wherein the stored template is obtained by estimating a Gaussian Mixture Model (GMM) user model for each first bigram of the sequence of first bigrams using a Universal Background Model (UBM) as a predefined GMM;
   a fusion module configured to fuse the likelihood ratios for all first bigrams to produce a total biometric score;
   and an authentication module configured to make an authentication decision based upon comparison of the total biometric score with a predetermined threshold.

* * * * *